Nov. 20, 1928.
W. H. HINZ
1,692,039
FILLER FOR RADIATOR PANS
Filed Nov. 19, 1927
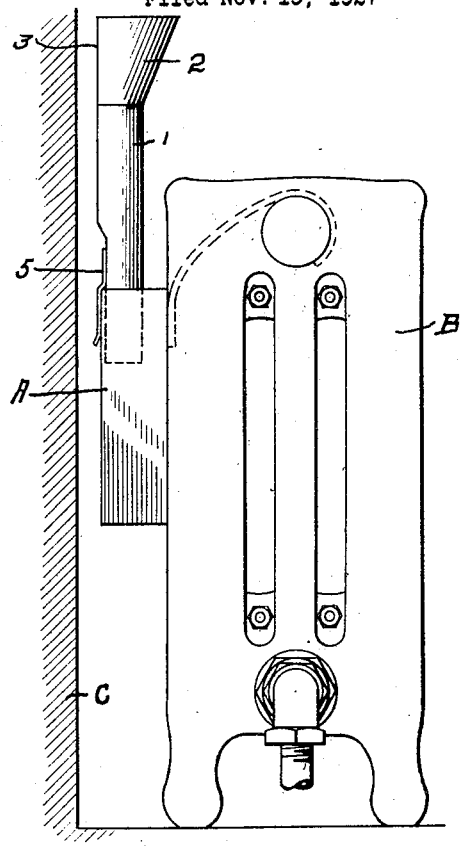
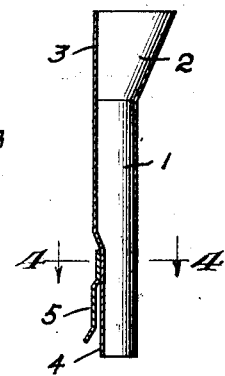
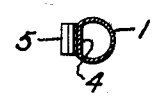
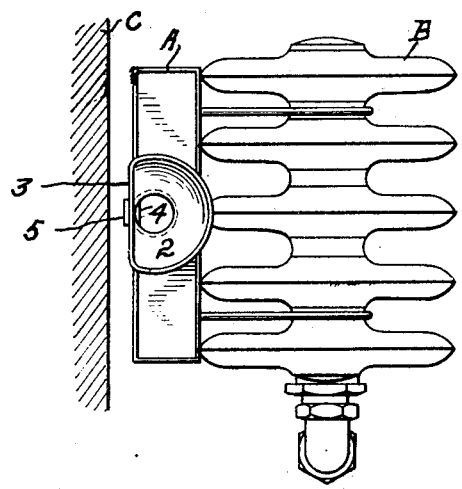

Patented Nov. 20, 1928.

1,692,039

UNITED STATES PATENT OFFICE.

WILLIAM H. HINZ, OF OAK PARK, ILLINOIS.

FILLER FOR RADIATOR PANS.

Application filed November 19, 1927. Serial No 234,352.

It is a common practice to hang evaporating pans behind radiators to provide moisture in a room heated by such radiators. The pans are ordinarily hung so that their tops are at some distance below the tops of the radiators, in order that the pans will be concealed from view; and therefore it is difficult to pour water into the pans without spilling the water and splashing the walls.

The object of the present invention is to produce a simple and novel device that may be applied to one pan after another and permit the pans to be easily filled without danger of spilling the water or splashing the walls.

The various features of novelty whereby my invention is characterized will hereinafter be pointed out with particularity in the claim; but, for a full understanding of my invention and of its objects and advantages, reference may be had to the following detailed description taken in connection with the accompanying drawing, wherein:

Figure 1 is an end view of a radiator placed near a wall, and having my improved attachment applied to an evaporating pan on the radiator; Fig. 2 is a top plan view of the radiator with the evaporating pan and filling attachment; Fig. 3 is a longitudinal central section through the attachment; and Fig. 4 is a section taken approximately on line 4—4 of Fig. 3.

My improvement consists of a funnel-like device comprising a tubular body member 1 and an enlarged head portion 2 which is preferably in the form of an inverted frustum of a cone. The part 1 may conveniently be cylindrical; while the head section is preferably flattened on one side, as indicated at 3, so that the plane of its outer face is tangent to the tubular body portion. The lower end of the body portion is flattened, as indicated at 4, on the same side as that on which the flattened part of the head member lies. A clip 5 that may consist simply of a flat strip of metal soldered or otherwise secured at its upper end to the device, lies against the flattened wall of the tubular body member. The lower end of the clip is preferably flared outwardly so as to provide a wide mouth between it and the flat wall of the device. By flattening the lower end of the tubular member, the clip is not required to project considerably beyond the rear face of the device.

In using the device, assuming that A represents an evaporating pan on a radiator B placed near the wall C of a room; it is simply slipped down behind the radiator with the lower end of the tubular member pressed against the inner face of the rear wall of the pan; whereupon the clip will pass down the rear or outer face of the rear wall of the pan. It is therefore preferable that the lower end of the clip terminate above the bottom of the tubular member, so that the latter may be inserted a short distance in the pan without interference from the clip. Since the clip, which is preferably made of resilient metal, is flat on its inner face, and the wall of the tube opposite is also flat, the device will be supported in an upright position when pushed in place on the pan. Therefore a person desiring to fill the pan has both hands free to manipulate the receptacle in which the water is carried, and the water may easily be poured into the filling device without danger of spilling. After one pan has been filled, the filling device is removed by lifting it up, and it may then be applied to another pan; the filling device being removed and laid away, so as to be out of sight, until it must be brought into use again.

It will thus be seen that I have produced a simple, novel and inexpensive means for permitting radiator pans to be easily filled, without requiring the pans to be placed high up on the radiators, and without making it necessary to have permanent attachments that are normally visible.

While I have illustrated and described with particularity only a single preferred form of my invention, I do not desire to be limited to the exact structural details thus illustrated and described; but intend to cover all forms and arrangements which come within the definitions of my invention constituting the appended claim.

I claim:—

A filling device for radiator pans comprising an open-ended tubular member having an enlarged upper end, the rear side of said enlarged end being in the same vertical plane as the rearmost vertical part of the said tubular member the lower end of the rear wall of the tubular member being displaced inwardly, and a vertical clip lying behind and secured at its upper end to said displaced part of the rear wall of said tubular member.

In testimony whereof, I sign this specification.

WILLIAM H. HINZ.